US005667396A

United States Patent [19]
Pan et al.

[11] Patent Number: 5,667,396
[45] Date of Patent: Sep. 16, 1997

[54] MEMORY CARD CONNECTOR WITH CARD EJECTION MECHANISM

[75] Inventors: H. T. Pan; Chu-Mei Chen; Ming-Yow Hon, all of Taipei Hsien, Taiwan

[73] Assignee: Tongrand Limited, Queensway, Hong Kong

[21] Appl. No.: 512,336

[22] Filed: Aug. 8, 1995

[51] Int. Cl.$^6$ .................................................. H01R 13/62
[52] U.S. Cl. ............................................................ 439/160
[58] Field of Search .................................... 439/152–160, 439/372

[56] References Cited

U.S. PATENT DOCUMENTS

| | | | |
|---|---|---|---|
| 5,145,389 | 9/1992 | Okubo | 439/159 |
| 5,161,989 | 11/1992 | Okubo et al. | 439/159 |
| 5,324,204 | 6/1994 | Lwee | 459/159 |
| 5,451,168 | 9/1995 | Shuey | 439/157 |

*Primary Examiner*—David L. Pirlot
*Attorney, Agent, or Firm*—Cushman Darby & Cushman IP Group of Pillsbury Madison & Sutro, LLP

[57] ABSTRACT

A memory card connector includes a pair of guide frames and a connector head. The ejection mechanism of the memory card connector comprises a top cover plate that has a pair of arms each extending from one end thereof for engaging one corresponding pair of guide frames. The top cover plate has a pair of guide rings each located at one end thereof and a guide sliding space formed between the guide rings. A rocker lever has a pivotal hole approximately at the center, and a guide containing opening is formed at one end. A push-out plate has a pair of sliding recessions and a pair of card pushing edges, wherein each pushing edge is located adjacent one end thereof and a guide rod formed between the sliding recession. A push rod has a rocker lever engaging slot at one end thereof. The pivotal hole of the rocker lever receives one of the guide ring shaft formed by the guide rings. The guide containing opening receives the guide rod of the push-out plate. Each pair of guide rings is slidably received in one corresponding pair of sliding recessions of the push-out plate. The guide rod of the push-out plate is further received in the guide sliding space of the top cover plate. The distal end of the rocker lever opposing the end thereof having the guide containing opening, is received in the rocker lever engaging slot of the push rod.

12 Claims, 8 Drawing Sheets

MEMORY CARD CONNECTOR WITH CARD EJECTION MECHANISM

BACKGROUND OF THE INVENTION

1. Field of the Invention

The present invention relates in general to a memory card connector. In particular, the present invention relates to a memory card connector having an ejection mechanism for ejecting the memory card inserted. More particularly, the present invention relates to a memory card connector having an ejection mechanism that is durable lo and simple in construction for easy manufacturing and is suitable for slim space applications.

2. Technical Background

Semiconductor integrated circuit memory cards, in particular, a number of IC peripheral functional expansion cards for portable computers are widely adopted in microprocessor-based computer systems as the means of peripheral device expansion. One of such memory cards is the PCMCIA card as proposed by the Personal Computer Memory Card International Association. The association is a computer industry group that defined the PCMCIA standard for small electronic cards and the way these cards communicate with the host computer.

As the name implies, the PCMCIA cards were intended primarily for the memory expansion of portable computer systems that require reduced overall system size, however, the PCMCIA standard has now evolved from its very first edition, Type I, through Type II, and now Type III within a relatively short period of time. The PCMCIA standard has been adopted by peripheral devices other than memory expansion adapter cards. They include, for example, PCMCIA network cards, SCSI cards, facsimile/modem cards, even sound cards and hard disk drive cards. It should therefore be noted that although the present invention utilizes the term "memory card connector", it should be understood that the card connector of the present invention is not limited only to the category of memory cards. Other categories of peripheral functional cards are also applicable in the use of the memory card of the present invention.

With wide acceptance of the PCMCIA cards for the microprocessor-based computer systems, in particular in the category of notebook computers, those computer systems providing compatibility for PCMCIA cards would have to be equipped with at least one PCMCIA slot. The memory card slot is basically an electrical signal connector that provides for the electrical connection between the electronic circuitry as contained in the PCMCIA card and the host system logic circuitry.

A card ejection mechanism is vital for the versatile use of the memory card connector in a host computer system. The inserted memory card must be able to be successfully removed whenever necessary. A number of U.S. patents disclosed such ejection mechanisms for the memory card connectors. For example, U.S. Pat. Nos. 5,152,687, 4,810,200, 5,011,420 and 5,149,276 disclosed several examples of such ejection mechanism. However, their implementation either employed the use of rivets, or was difficult to repair, or was too thick in dimension to be suitable for slim space applications. Improvements of the ejection mechanism for memory card connectors are therefore desirable.

SUMMARY OF THE INVENTION

It is therefore an object of the present invention to provide a memory card connector having an ejection mechanism that is durable for use.

It is another object of the present invention to provide a memory card connector having an ejection mechanism that is simple in structural construction for ease of manufacture and low cost.

It is still another object of the present invention to provide a memory card connector having an ejection mechanism that is simple in structural configuration for use in slim space applications.

The present invention achieves the above-identified objects by providing a card ejection mechanism for a memory card connector. The memory card connector includes a pair of guide frames and a connector head. Each of the guide frames has a guiding slot for slidingly receiving the corresponding edge of a memory card inserted into therein. The connector head has a set of individual electrical connectors for providing to a host system the electrical connection of the electronic circuitry of the inserted memory card. The ejection mechanism comprises a top cover plate that has a pair of arms each extending from one end thereof for engaging with a corresponding one of the pair of guide frames. The top cover plate has a pair of guide rings each located at one end thereof and a guide sliding space formed between the guide rings. A rocker lever has a pivotal hole at the center, and a guide containing opening is formed at one end. A push-out plate has a pair of sliding recessions and a pair of card pushing edges each located at one end thereof and a guide rod formed between the sliding recession. A push rod has a rocker lever engaging slot at one end thereof. The pivotal hole of the rocker lever receives one guide ring shaft formed by the guide rings. The guide containing opening receives the guide rod of the push-out plate. Each of the pair of guide rings is slidably received in the corresponding one of the pair of sliding recessions of the push-out plate. The guide rod of the push-out plate is further received in the guide sliding space of the top cover plate. The end of the rocker lever opposing the end thereof having the guide containing opening is received in the rocker lever engaging slot of the push rod.

BRIEF DESCRIPTION OF THE DRAWING

Other objects, features, and advantages of the present invention will become apparent by way of the following detailed description of the preferred but non-limiting embodiments. The description is made with reference to the accompanying drawings in which:

FIG. 8 is an enlarged perspective view of the portion of integration of the rocker lever and the push rod of the ejection mechanism employed in the memory card connector of FIG. 1.

DETAILED DESCRIPTION OF THE PREFERRED EMBODIMENT

Figure 1:
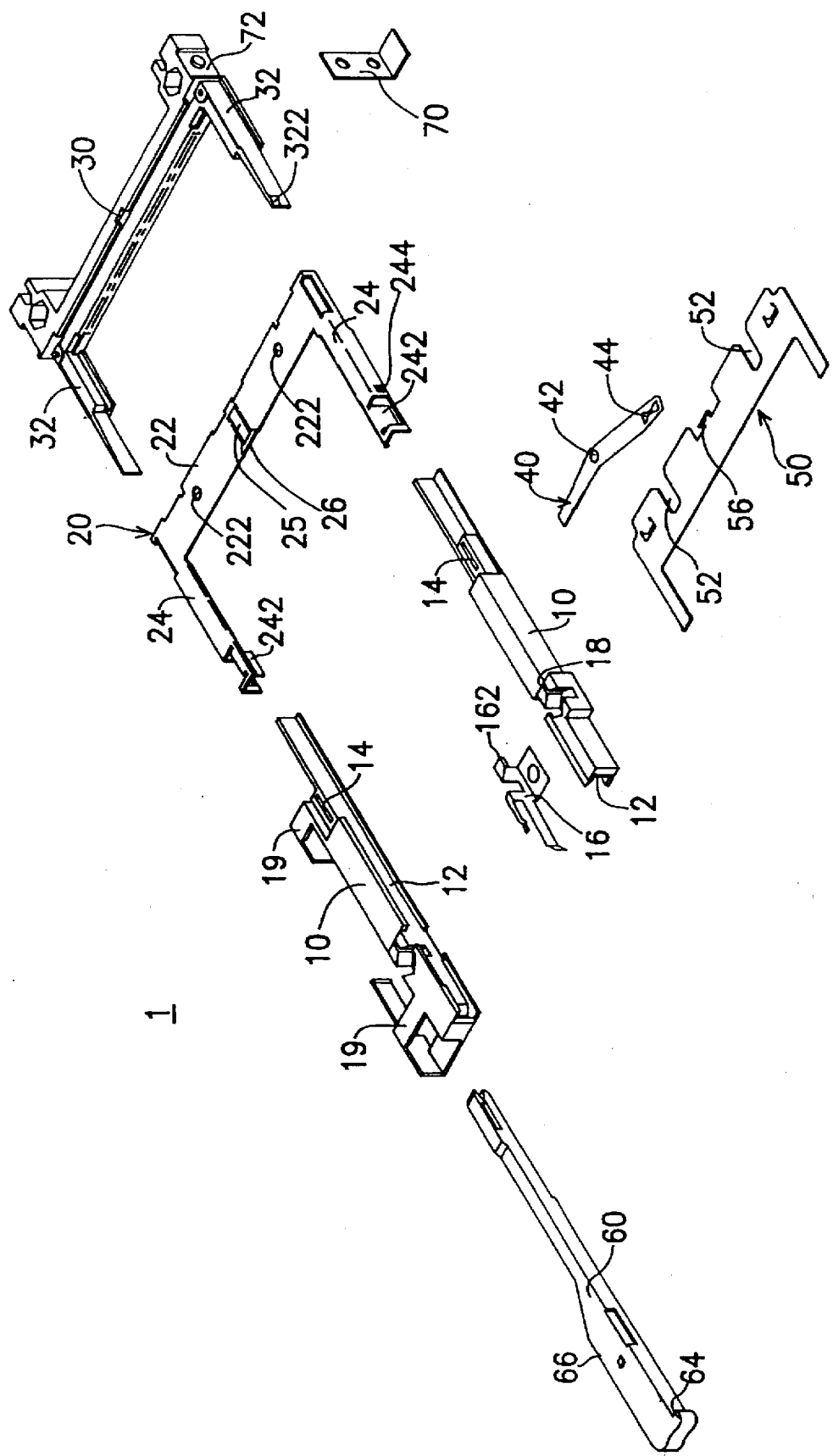
FIG. 1 is an exploded perspective view of the memory card connector having the ejection mechanism in accordance with a preferred embodiment of the present invention.
Figure 2:
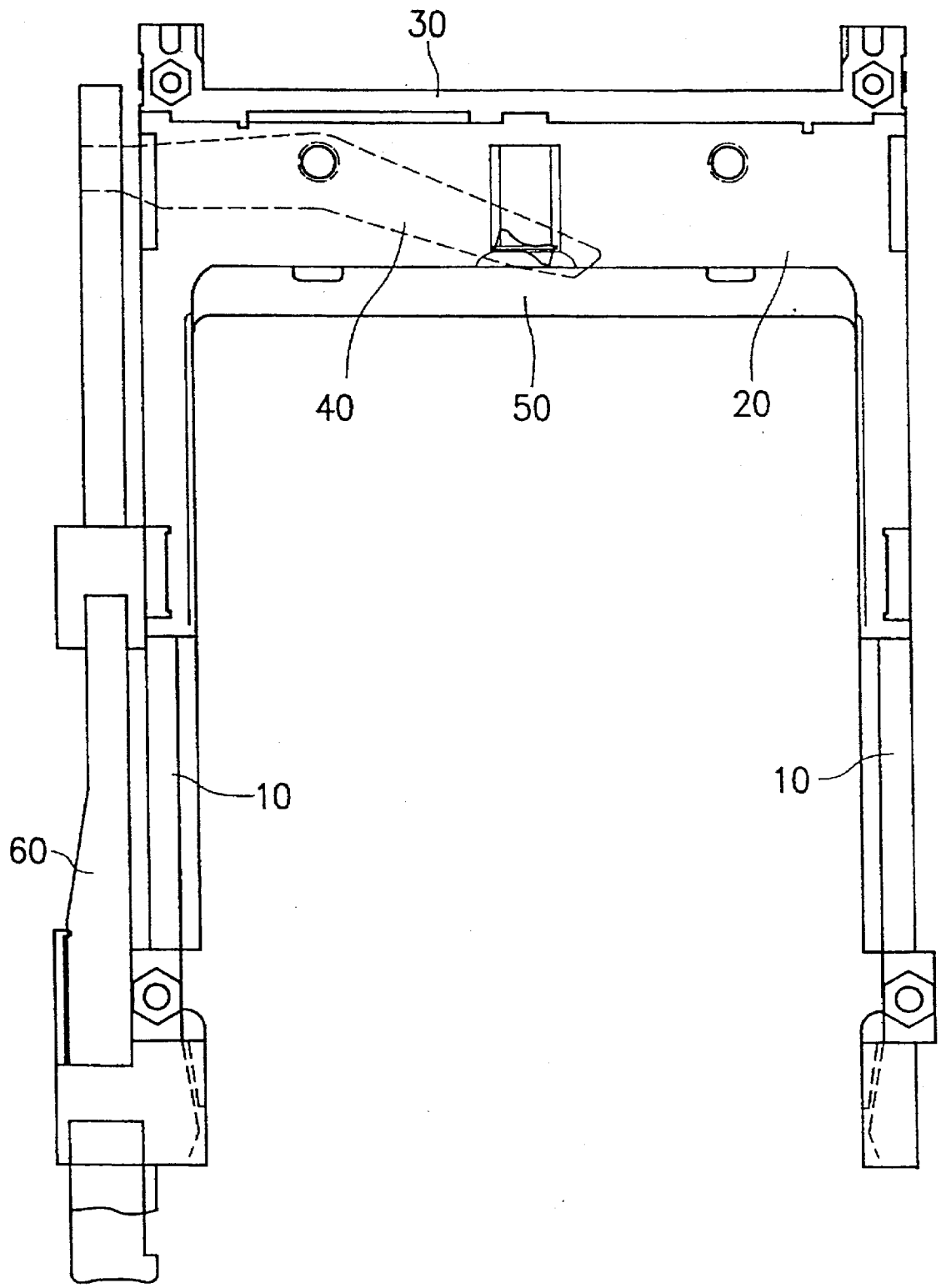
FIG. 2 is a top view of the memory card connector having the ejection mechanism of FIG. 1.

Reference is directed to FIGS. 1 and 2 simultaneously. FIG. 1 is an exploded perspective view of the memory card connector having the ejection mechanism in accordance with a preferred embodiment of the present invention, while FIG. 2 is a top view of the memory card connector of FIG. 1 in the assembled status thereof. As is seen in the drawing, the memory card connector, generally identified by the reference numeral 1, is a connector suitable for receiving the insertion of a peripheral function card such as, for example, a memory card (not shown) in a host computer system. The peripheral card can be removed out of the memory card connector whenever necessary, for example, when another function peripheral card is needed to be incorporated into the host system utilizing the same connector 1.

The memory card connector 1, as observed in the exploded perspective view of FIG. 1, is comprised of a pair of guide frames 10, a top cover plate 20, a connector head 30, a rocker lever 40, a push-out plate 50, and a push rod 60. Each of the guide frames 10 has a guiding slot 12, utilized for guiding and containing the edges of the memory card during the process of its insertion, as well as removal. One of the guide frames 10 has a sliding guide 19, utilized for slidingly receiving the push rod 60 therein. These constituent components may be assembled to form the memory card connector with an ejection mechanism in accordance with the present invention. FIG. 2 of the drawing is a top view of this memory card connector, as assembled utilizing the components shown in FIG. 1.

Since the memory card is to be incorporated as an additional functional part of the electronics of the host system, which is via the connection of its electronic circuitry through the connector 1, it is therefore important that the two systems that are originally physically separate be perfectly combined into one complete electronic system. As persons skilled in the art may well appreciate, this would include the firm and secure establishment of the grounding path among the combined host and card electronic systems. For this purpose, a grounding strip 16 is provided as the means to secure the establishment of the grounding path.

Figure 3:
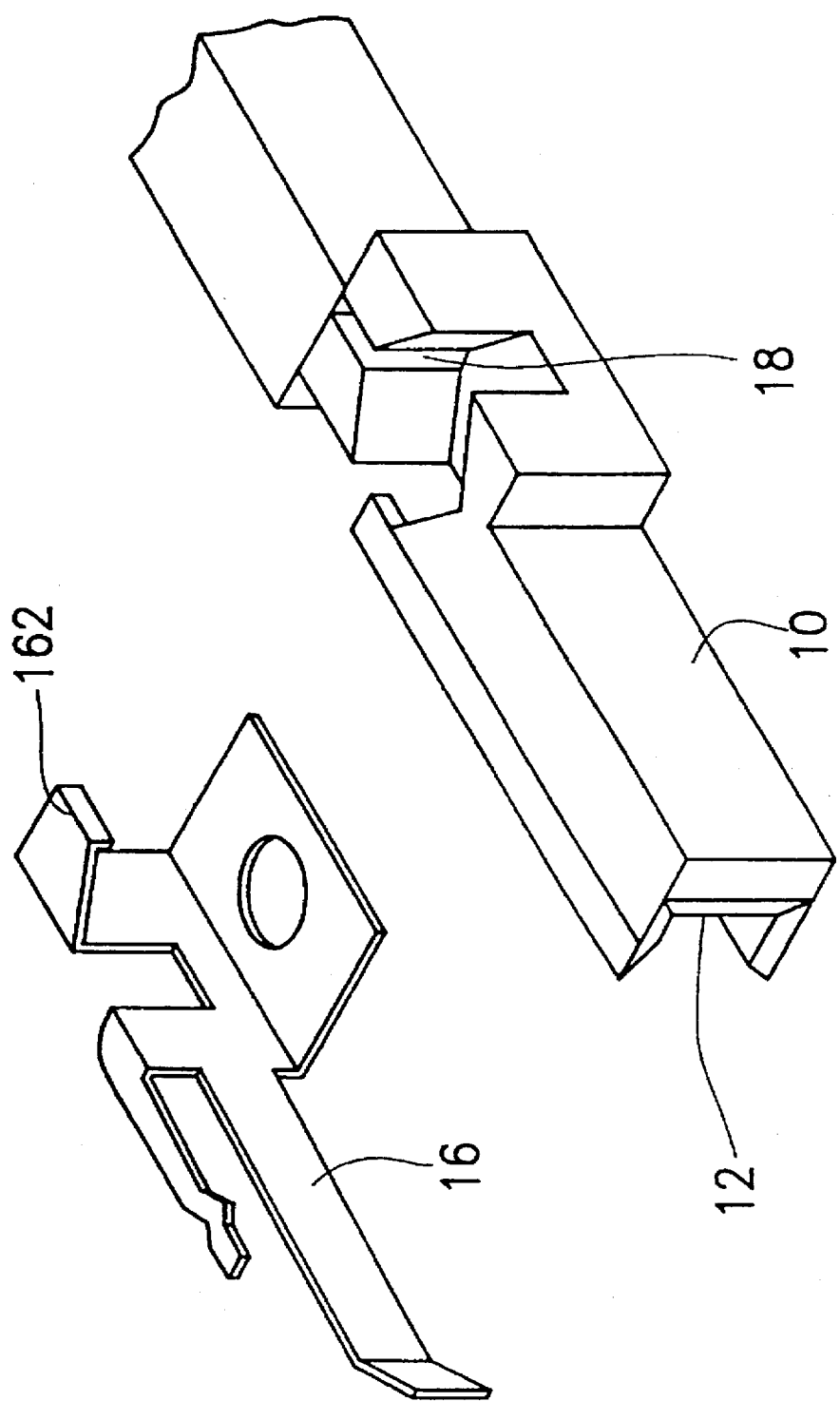
FIG. 3 is an enlarged perspective view of the grounding strip and the corresponding guide frame of the memory card connector of FIG. 1.

FIG. 3 is an enlarged perspective view of the grounding strip 16 and the corresponding guide frame 10 of the memory card connector 1 of FIGS. 1 and 2. In general, one grounding strip 16 is attached to each pair of guide frames 10 in a firm and secure manner. The grounding strip 16 has a bent portion 162 that serves to hold the strip 16 itself onto the guide frame 10. When the grounding strip 16 is attached to the guide frame 10, the bent portion 162 thereof would be inserted into the receiving slot 18 formed on the top surface of the guide frame 10, and the primary longitudinal section of the strip 16, as can be observed in the drawing, would be fittedly contained in the guiding slot 12 of the frame 10. Thus, the grounding strip 16 can provide an electrical contact with the edge of the memory card inserted in the memory card connector 1, establishing the necessary grounding path thereby.

Figure 4:
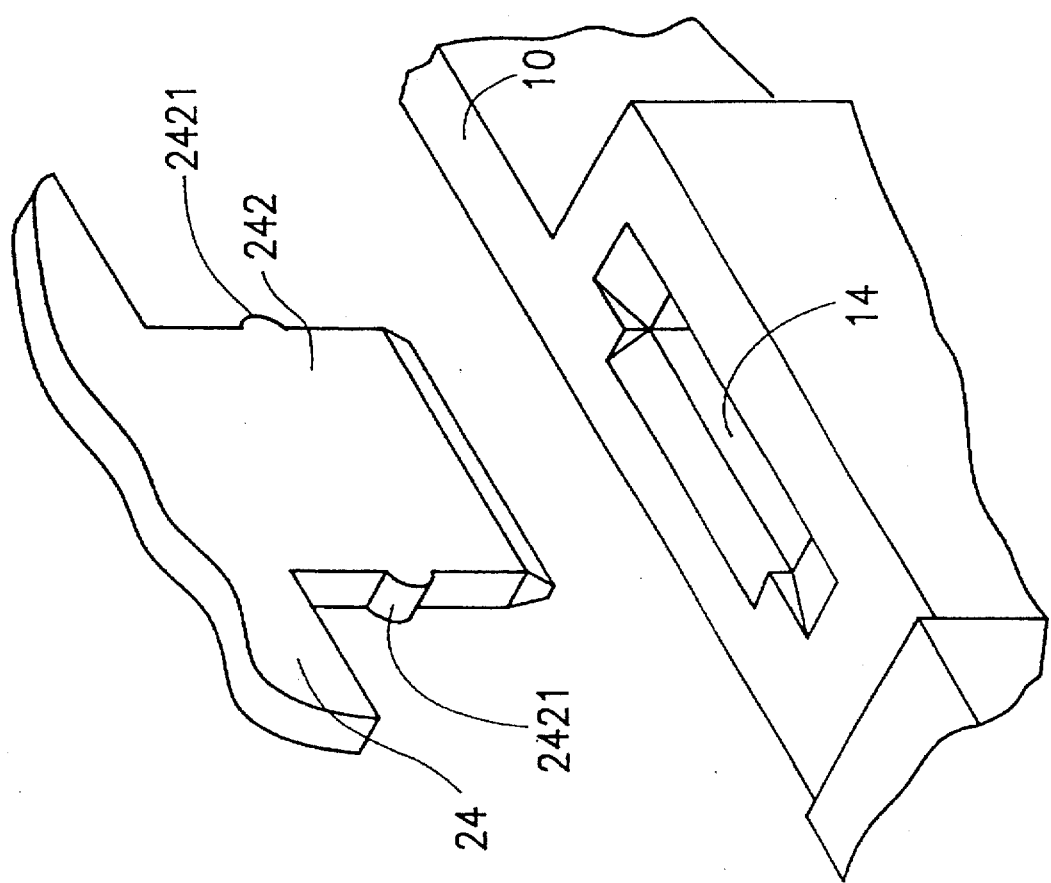
FIG. 4 is an enlarged perspective view of the portion of integration of the top cover plate and the guide frame of the memory card connector of FIG. 1.

Referring again to FIG. 1, a clamp notch 14 is formed on each of the pair of guide frames 10 for providing a means for secure attachment by the top cover plate 20. The cover plate 20 is comprised generally of a plate body 22 that has one cover plate arm 24 extending at each end of the longitudinal plate body thereof. Reference is simultaneously directed to FIG. 4 of the drawing, wherein an enlarged perspective view of the portion of integration of the top cover plate 20 and the guide frame 10 of the memory card connector of FIG. 1 is shown in detail. As can be seen from the enlarged detail, each cover plate arm 24 of the top cover plate 20 has a protruding clamp piece 242 that can be fittedly inserted into the corresponding clamp notch 14 formed on each of the guide frames 10. The mating of the clamp piece 242 and the clamp notch 14 can be secured from accidental disengagement by the small projections 2421 on both sides of the clamp piece 242. These small projections 2421 can be installed in the corresponding slots properly formed inside the clamp notch 14, not shown in the drawing. The engagement of the top cover plate 20 with the two guide frames 10 can thus form a containing space for the inserted memory card.

Figure 5:
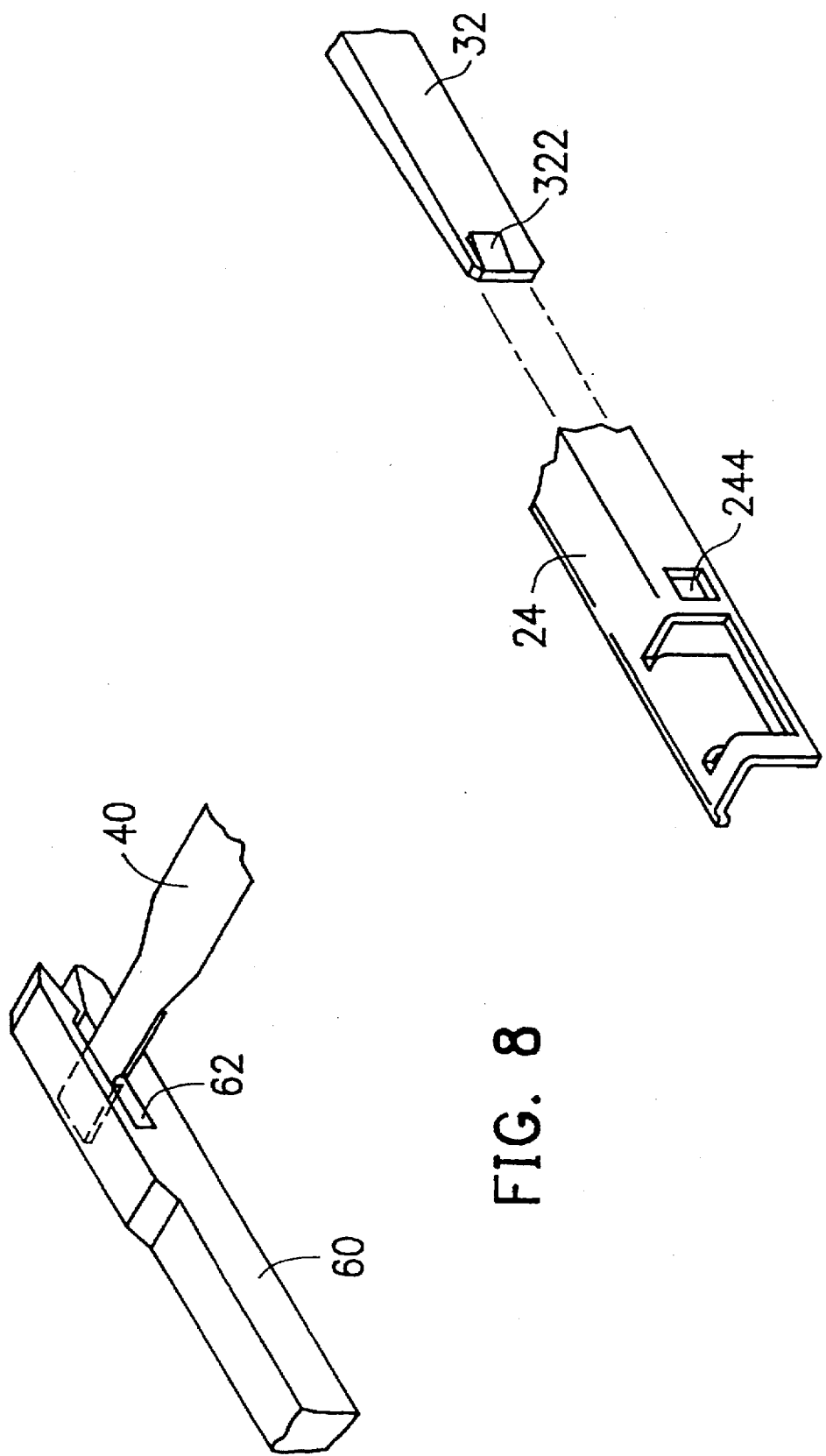
FIG. 5 is an enlarged perspective view of the portion of integration of the top cover plate and the connector head of the memory card connector of FIG. 1.

Refer again to FIG. 1. The connector head 30 is comprised primarily of a connector that is utilized to mate with the corresponding connecting means provided on the insertion end of the memory card inserted in the memory card connector. Similar to the top cover plate 20, the connector head 30 has one connector arm 32 extending at each end thereof toward the same direction. A retaining projection 322 is provided on the exterior side wall of the connector arm 32 near the far end thereof. As is seen in the details of FIG. 5, a retaining projection 322 may be inserted into the corresponding retaining hole 244 formed on the side wall of the cover plate arm 24, when the connector head 20 and the top cover plate 30 are assembled together. For a perspective view, back in FIG. 1, each cover plate arm 24 is formed with a retaining hole 244 on the sidewall thereof. This retaining hole 244 may receive the corresponding retaining projection 322 formed on the connector arm 32 of the connector head 30 when the latter is assembled and engages with the top cover plate 20 as described above.

Figure 6:
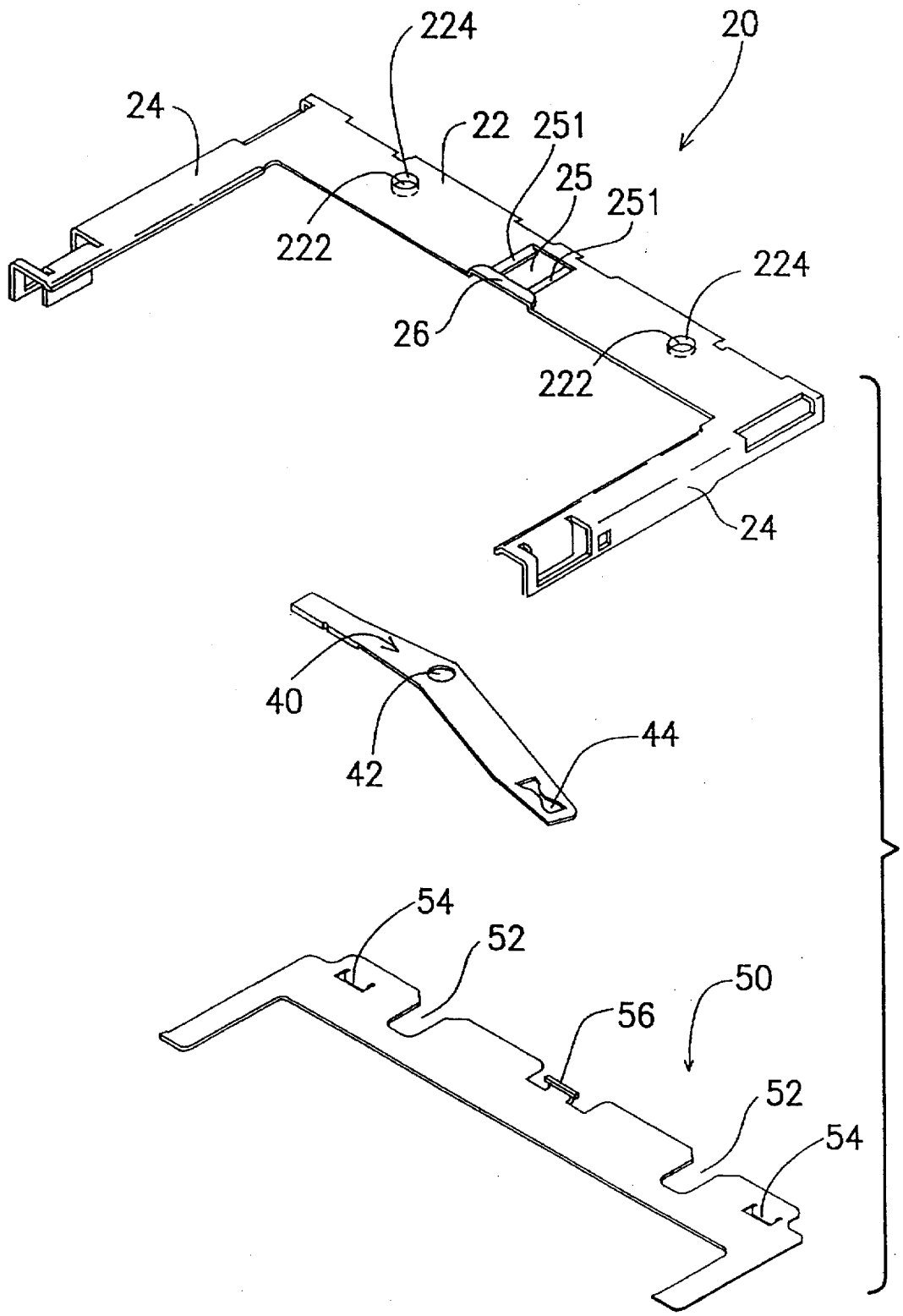
FIG. 6 is an exploded perspective view of the ejection mechanism employed in the memory card connector of FIG. 1.

Next, the ejection mechanism for the memory card connector of the present invention is described. Referring still to FIG. 1. On the plate body 22 of the top cover plate 20, there is also provided a pair of guide rings 224 at both ends thereof. The guide rings 224 are rings formed, for example, the press-forming process when punching through with the result of the formation of the holes 222. The rings 224 extend beyond the lower surface of the plate body 22 of the top cover plate 20; therefore, it is not directly seen in the enlarged perspective view of the constituent components of the ejection mechanism of FIG. 6. It is only reflected by the fact that the inner side wall of the guide rings 224 as is observable in FIG. 6 is thicker than other portions of the plate body 22 of the top cover plate 20. The purpose for the formation of the guide rings 224 are to guide the restricted sliding motion of the push-out plate 50 when the two are assembled together, as would be described in detail below.

Also in the enlarged perspective view, FIG. 6, of the components for the ejection mechanism, there is further provided a guide entry elevation 26 that is a small and long elevated portion of the plate body 22, a guide sliding space 25 that is a substantially rectangular hole opened in the plate body 22, and a pair of guide rails 251 formed alongside an opposite pair of edges of the guide sliding space 25. The role of the presence of the guide entry elevation 26, the guide sliding space 25, and the guide rails 251 is to allow for the reception and restricted sliding motion of a guide rod of the push-out plate 50, with details thereof to be described below.

Refer still to FIG. 6. A perspective view of the rocker lever 40 shows that the lever 40 has a pivotal hole 42 at substantially the center portion of the slightly bent longitudinal body thereof. On one end of the rocker lever 40, there is provided a guide containing opening 44 for receiving the insertion of the guide rod 56 of the push-out plate 50, as will be described below.

Still in FIG. 6, a perspective view of the push-out plate 50 shows that the plate 50 is basically a long plate with a short arm extension at both ends thereof. The push-out plate 50 has formed on both ends a sliding recession 52, as well as a guide rod 56 formed at the end of a bent-up portion. It should be noticed that the guide rod 56 is raised above the surface of the push-out plate 50 itself. Two memory card pushing edges (not shown in the drawings) are each bent downward at each end of the push-out plate 50. When the push-out plate 50 is pushed out, pushing edge 54 serves to engage the insertion end of the inserted memory card and actually push the card out of the memory card connector 1.

The top cover plate 20, the rocker lever 40, and the push-out plate 50 are to be assembled together to form a subassembly for the memory card connector 1, having an ejection mechanism, of the present invention. In general, the rocker lever 40 would first be installed to the top cover plate 20 by allowing the guide ring 224 on the plate body 22 to be received in the pivotal hole 42 thereof. In the depicted embodiment of the present invention as shown in the drawing, the guide ring 224 on the left end of the plate body 22 would be utilized as the pivotal shaft for the rocker lever 40.

Then, the guide rod 56 of the push-out plate 50 would be inserted and received in the guide containing opening 44 of the rocker lever 40.

With the guide rod 56 of the push-out plate 50 contained in the guide containing opening 44 of the rocker lever 40, and the guide ring 224 also received in the pivotal hole 42 of the rocker lever 40, the guide rod 56 can further be installed in the guide sliding space 25 of the plate body 22 of the top cover plate 20. This can be done by properly moving the guide rod 56 underneath the guide entry elevation 26 at the edge of the plate body 22, and then pushing the guide rod 56 into the guide sliding space 25. An enlarged perspective view of this engagement in FIG. 7 shows the details of the relative relationship between the three parts, namely the plate body 22 of the top cover plate 20, the rocker lever 40, and the guide rod 56 of the push-out plate 50.

When the three components for the ejection mechanism of the memory card connector 1 of the present invention are assembled together, each of the two guide rings 224 of the top cover plate 20 would also be received in each sliding recession 52 of the push-out plate 50. The thickness, or in other words, the height of the guide rings 224 wherein such guide rings extend beyond the lower surface of the plate body 22 of the top cover plate 20, should be selected to be sufficient to allow for the sliding engagement of the guide rings 224 and the sliding recession 52. This is particularly important for the guide ring 224 that also serves as the pivotal shaft for the rocker lever 40. When assembled, the rocker lever 40 would be sandwiched between the top cover plate 20 and the push-out plate 50, as is schematically shown in the top view of FIG. 2.

Figure 7:
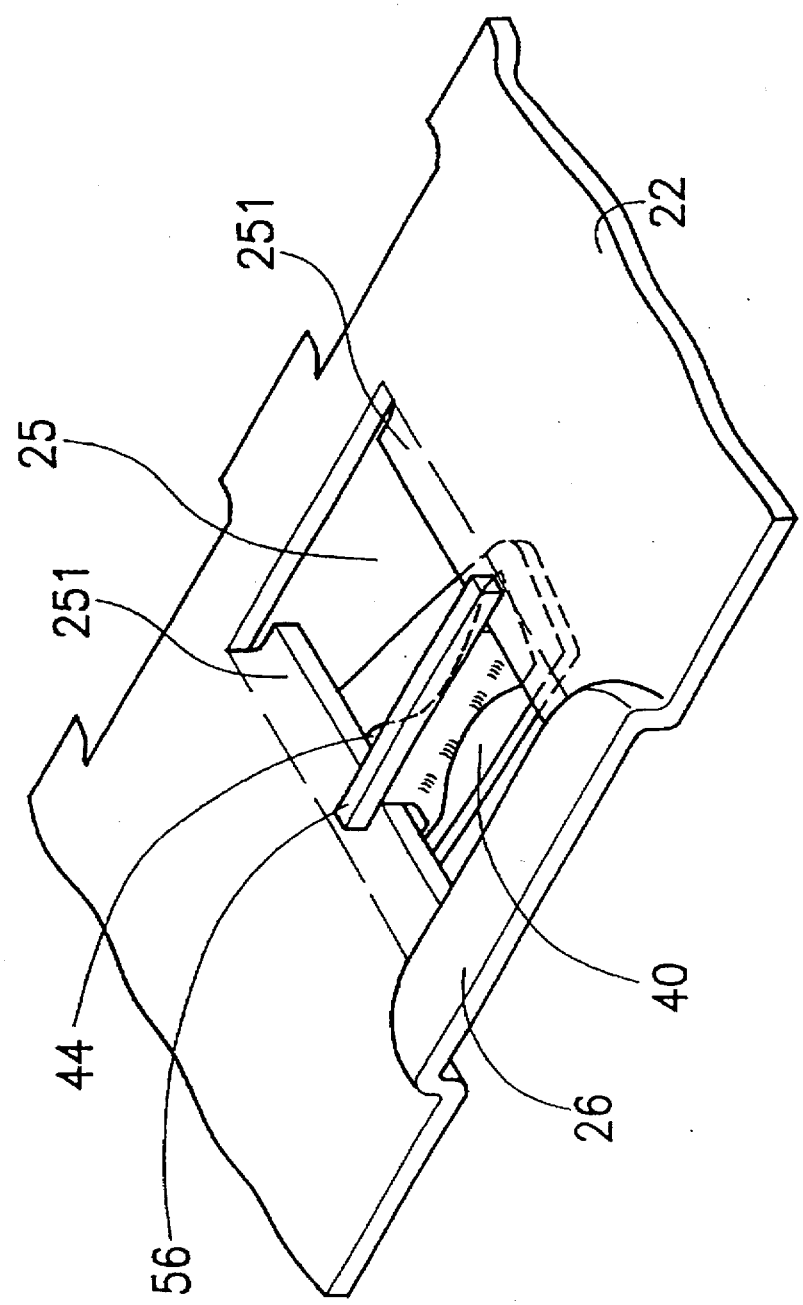
FIG. 7 is the perspective view of a partially enlarged portion of the ejection mechanism employed in the memory card connector of FIG. 1.

As is seen in FIG. 7, the guide rod 56 of the push-out plate 50 is raised above a bent portion. The guide rod 56 has an extended length that extends out of both edges of the bent supporting portion underneath. These two extended sections on both ends of the guide rod 56 are riding on the top surface of the guide rails 251 on the opposite edges of the guide sliding space 25. This arrangement allows the corresponding end of the rocker lever 40 to be retained in the restricted area, namely, the area defined by the guide sliding space 25 of the plate body 22 of the top cover plate 20, although allowed to be freely moved therein.

As the corresponding end of the rocker lever 40 is moved back and forth inside the restricted area of the guide sliding space 25, the push-out plate 50 is dragged along with the swinging movement of the rocker lever 40. Since the rocker lever 40 would swing when a memory card is installed or removed, the relative angle between the generally longitudinal axis of the rocker lever 40 and the direction of the restricted back and forth movement of the push-out plate 50 would not be maintained at a fixed value. The shape of the guide containing opening 44 of the rocker lever 40 is therefore selected to be generally of sandglass-like shape, as is exemplified in FIG. 6, to be able to fulfill this requirement.

As the human actuation part of the ejection mechanism, the push rod 60 contained in the sliding guide 19 with its inner end engaging the distal end of the rocker lever 40 at a rocker lever engaging slot 62 thereof, can provide for the user to depress inwardly on the push head 64 thereof, so the rocker lever 40 may swing and pushes the push-out plate 50 outward. FIG. 8 of the drawing shows an enlarged perspective view of the portion of integration of the rocker lever 40 and the push rod 60 of the ejection mechanism employed in the memory card connector of FIG. 1. As the push-out plate 50 is pushed out, the memory card pushing edge 54 would then bring the memory card out of its engagement with the connector head 30 in the memory card connector. On the other hand, when a memory card is inserted into the memory card connector of the present invention, the push-out plate 50, being brought in the inward direction as a result of the incoming card pushing on the memory card pushing edge 54, the rocker lever 40 will be swinging in the direction that pushes the push rod 60 in the outward direction. The positioning notch 66 now serves to maintain the push rod 60 in its pushed-out position by means of being engaged by a stopping edge formed on the sliding guide 19.

Figure 9:
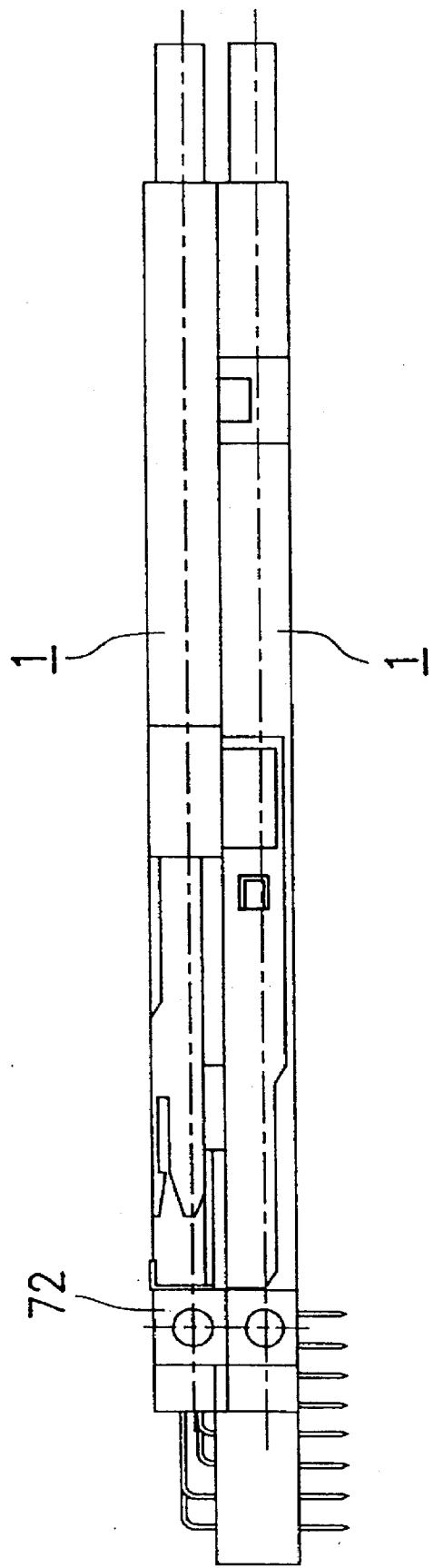
FIG. 9 schematically shows the integration of two memory card connectors having the ejection mechanism of the present invention.

More than one memory card connector with ejection mechanism can be combined together to provide the capability of receiving two memory cards simultaneous by a host computer. The integration plate 70 shown in FIG. 1 serves the function of aligning two memory card connectors in the host system by aligning the connectors with their respective positioning protrusions 72. FIG. 9 schematically shows the integration of two memory card connectors 1 having the ejection mechanism of the present invention.

The memory card connector with the card ejection mechanism of the present invention as described above in detail has at least the following advantages. First of all, the memory card connector of the present invention is durable for use. The guide rail 251 and guide rod 56 configuration is a rugged design that can sustain prolonged periods of repeated ejection of inserted memory cards. The simple structural configuration of the memory card ejection mechanism has virtually no possibility of ejection failure since the mechanism is securely assembled with no possibility of disassembly. Secondly, the ejection mechanism for the memory card connector is simple to manufacture, with all the parts suitable for the press-forming process of production. This results in reduced cost. Thirdly, the simple mechanism also implies that the connector can be made as slim as possible. This is particularly suitable for applications where space limitation is an important factor.

What is claimed is:

1. An ejection mechanism for a memory card connector apparatus, said memory card connector apparatus including a pair of guide frames and a connector head, each of said guide frames having a guiding slot for slidingly receiving a corresponding edge of a memory card inserted into said memory card connector apparatus, and said connector head having a set of electrical connector means for providing electrical connection of electronic circuitry of said inserted memory card to a host system housing said memory card connector apparatus, said ejection mechanism comprising:

a longitudinal top cover plate having a pair of arms each extending from one end thereof for engaging a corresponding one of said pair of guide frames, said top cover plate having a pair of guide rings each located adjacent to one end thereof and a guide sliding space formed between said guide rings;

a substantially longitudinal rocker lever having a pivotal hole at substantially a center thereof, and a guide-containing opening at one end thereof;

a longitudinal push-out plate having a pair of sliding recessions and a pair of card pushing edges and a guide rod formed between said sliding recessions; and a longitudinal push rod having a rocker lever engaging slot at one end thereof;

said pivotal hole of said rocker lever receiving one guide ring shaft formed by said guide rings, said guide-containing opening receiving said guide rod of said push-out plate, each of said pair of guide rings being slidably received in a corresponding one of said pair of sliding recessions of said push-out plate, said guide rod of said push-out plate being further received in said guide sliding space of said top cover plate, and a distal end of said rocker lever opposite the end thereof having said guide-containing opening being received in said rocker lever engaging slot of said push rod; wherein said guide sliding space of said top cover plate is a rectangular opening having a pair of guide rails each located at an edge of said rectangular opening, said guide rails being lowered below a surface of said top cover plate for receiving end extension portions of said guide rod of said push-out plate, thus allowing a restricted sliding motion of said guide rod inside said guide sliding space.

2. The ejection mechanism for a memory card connector apparatus of claim 1, wherein said guide rings of said top cover plate are protruding rings extending beyond a bottom surface of said top cover plate and having sufficient height for both being received in said pivotal hole of said rocker lever and being received in said sliding recession of said push-out plate.

3. The ejection mechanism for a memory card connector apparatus of claim 1, wherein said guide rod formed between said sliding recessions of said push-out plate is raised above a surface of said push-out plate.

4. The ejection mechanism for a memory card connector apparatus of claim 1, wherein each of said pair of card pushing edges each located at one end of said push-out plate is a small bent piece extending downward.

5. The ejection mechanism for a memory card connector apparatus of claim 1, wherein each of said pair of arms of said top cover plate includes a connection means for connecting to said corresponding one of said pair of guide frames.

6. The ejection mechanism for a memory card connector apparatus of claim 1, wherein said connector head further includes one arm extending at each end thereof, each of said arms having a connection means for connecting to a corresponding one of said pair of arms of said top cover plate.

7. The ejection mechanism for the memory card connector apparatus of claim 1, wherein said connector plate includes a positioning protrusion on a side surface thereof for mounting an integration plate to align two of said connector heads with said respective positioning protrusions.

8. An ejection mechanism for use within a memory card connector apparatus, comprising:

a top cover plate directly fastened to times of said connector apparatus, said top cover plate including a guide sliding space formed therein;

a push-out plate positioned beneath said top cover plate, said push-out plate including a guide rod upward extending therefrom; and a rocker lever sandwiched between said top cover plate and said push-out plate, said rocker lever including a guide-containing opening, a pivotal hole and at least a memory card pushing edge; wherein a first alignment means is provided to substantially securely align the pivotal hole of the rocker lever to the top cover plate in a vertical direction so that the rocker lever can appropriately swing with regard to the top cover plate about an axis along an axial direction of said pivotal hole; and a second alignment means is provided to efficiently align the guide rod of the push-out plate to the guide-containing opening of the rocker lever in the vertical direction, thereby when the rocker lever is rotated about its pivotal hole, the guide-containing opening of the rocker lever can cooperate with the guide rod of the push-out plate to move in a front-to-end direction within a range defined by said guide sliding space in the top cover plate, and wherein said first alignment means includes the pivotal hole of the rocker lever and a guide ring formed on the top cover plate, and said guide ting extends downward so as to protrude from a bottom surface of the top cover plate so that said guide ring is substantially received within said pivotal hole of the rocker lever, thus assuring a vertical mutual alignment of the rocker lever and the top cover plate along said axis, and said guide ring of the top cover plate further extends into a recession in the push-out plate, thus providing an assistance for aligning a front-to-end movement of said push-out plate with regard to the top cover plate.

9. The ejection mechanism as described in claim 8 further comprising multiple card alignment means for aligning two of said memory card connector apparatuses to provide a host computer with a capability to receive two of said memory card apparatuses simultaneously.

10. The ejection mechanism as described in claim 8, wherein said second alignment means includes the guide rod of the push-out plate and the guide containing opening of the rocker lever whereby the guide rod of the push-out plate is substantially received within the guide containing opening of the rocker lever, thus forming a connection there between.

11. The ejection mechanism as described in claim 10, wherein said guide rod of the push-out plate further upward extends a bit beyond said guide containing opening of the rocker lever, and forms extended sections on two opposite ends to ride on top surfaces of two corresponding guide rails on two opposite edges of the sliding space, thus assuring assembling of said push-out plate and the top cover plate in the vertical direction.

12. The ejection mechanism as described in claim 11, wherein said top cover plate further includes a guide entry elevation in alignment with the guide sliding space in the front-to-end direction for easy reception of the guide rod of the push-out plate within the guide sliding space of the top cover plate.

* * * * *